United States Patent
Oren

(10) Patent No.: US 8,827,118 B2
(45) Date of Patent: Sep. 9, 2014

(54) PROPPANT STORAGE VESSEL AND ASSEMBLY THEREOF

(75) Inventor: John Oren, Houston, TX (US)

(73) Assignee: Oren Technologies, LLC, Houston, TX (US)

( * ) Notice: Subject to any disclaimer, the term of this patent is extended or adjusted under 35 U.S.C. 154(b) by 0 days.

(21) Appl. No.: 13/332,937

(22) Filed: Dec. 21, 2011

(65) Prior Publication Data

US 2013/0161211 A1    Jun. 27, 2013

(51) Int. Cl.
B65D 25/08    (2006.01)

(52) U.S. Cl.
USPC ......... 222/185.1; 222/143; 222/462; 206/221

(58) Field of Classification Search
USPC ............. 222/185.1, 145.1, 143, 145.2, 145.5, 222/460–462; 206/221; 220/565
See application file for complete search history.

(56) References Cited

U.S. PATENT DOCUMENTS

| | | | |
|---|---|---|---|
| 137,871 A | 4/1873 | Worsley | |
| 150,894 A | 5/1874 | Safely | |
| 1,143,641 A | 6/1915 | McGregor | |
| 1,850,000 A | 3/1932 | Fernand | |
| 2,616,758 A | 11/1952 | Meyers | |
| 2,622,771 A * | 12/1952 | Tulou | 222/502 |
| 2,652,174 A | 9/1953 | Shea et al. | |
| 2,865,521 A | 12/1958 | Fisher et al. | |
| 2,894,666 A * | 7/1959 | Campbell, Jr. | 222/528 |
| 3,090,527 A | 5/1963 | Rensch | |
| 3,248,026 A | 4/1966 | Kemp | |
| 3,270,921 A * | 9/1966 | Nadolske et al. | 222/132 |
| 3,281,006 A | 10/1966 | Tohchung | |
| 3,294,306 A * | 12/1966 | Areddy | 206/596 |
| 3,318,473 A * | 5/1967 | Jones et al. | 414/608 |
| 3,387,570 A | 6/1968 | Pulcrano et al. | |
| 3,397,654 A | 8/1968 | Snyder | |
| 3,407,971 A * | 10/1968 | Oehler | 222/185.1 |
| 3,602,400 A * | 8/1971 | Cooke | 222/143 |
| 3,661,293 A | 5/1972 | Gerhard et al. | |
| 3,738,511 A | 6/1973 | Lemon et al. | |
| 3,785,534 A * | 1/1974 | Smith | 222/460 |
| 3,986,708 A | 10/1976 | Hellzel et al. | |
| 4,004,700 A | 1/1977 | Empey | |
| 4,138,163 A | 2/1979 | Calvert et al. | |
| RE30,358 E | 8/1980 | Sensibar | |
| 4,247,228 A | 1/1981 | Gray et al. | |

(Continued)

FOREIGN PATENT DOCUMENTS

JP    10264882 A    10/1998

*Primary Examiner* — Paul R Durand
*Assistant Examiner* — Donnell Long
(74) *Attorney, Agent, or Firm* — Bracewell & Giuliani LLP

(57) ABSTRACT

A proppant storage vessel has a first container with an interior volume, and a second container supported in spaced relation above the first container. The first container has a bottom hatch affixed to a bottom wall thereof. The bottom hatch is movable between an open position and a closed position. The first container has an opening at a top wall thereof. The second container has bottom hatch formed on a bottom wall thereof. The bottom hatch of the second container is aligned with the opening of the first container such that a proppant in the second container can flow through the hatch thereof into the interior volume of the first container. Each of the containers includes first, second, third and fourth inclined surfaces positioned in the interior volume and extending from the respective side walls and end walls thereof toward the bottom hatch.

15 Claims, 4 Drawing Sheets

(56) References Cited

U.S. PATENT DOCUMENTS

| | | | |
|---|---|---|---|
| 4,282,988 A * | 8/1981 | Hulbert, Jr. | 222/184 |
| 4,397,406 A * | 8/1983 | Croley | 222/105 |
| 4,398,653 A | 8/1983 | Daloisio | |
| 4,428,504 A | 1/1984 | Bassett et al. | |
| 4,449,861 A | 5/1984 | Saito et al. | |
| 4,608,931 A | 9/1986 | Ruhmann et al. | |
| 4,626,155 A | 12/1986 | Hlinsky et al. | |
| 4,819,830 A | 4/1989 | Schultz | |
| 4,848,605 A * | 7/1989 | Wise | 222/608 |
| 4,909,556 A | 3/1990 | Koskinen | |
| 4,919,583 A | 4/1990 | Speakman, Jr. | |
| 4,946,068 A * | 8/1990 | Erickson et al. | 222/23 |
| 4,975,205 A | 12/1990 | Sloan | |
| 4,995,522 A | 2/1991 | Barr | |
| 5,105,858 A | 4/1992 | Levinson | |
| 5,199,826 A | 4/1993 | Lawrence | |
| 5,224,635 A * | 7/1993 | Wise | 222/608 |
| 5,373,792 A | 12/1994 | Pileggi et al. | |
| 5,402,915 A * | 4/1995 | Hogan | 222/105 |
| 5,441,321 A * | 8/1995 | Karpisek | 294/68.21 |
| 5,538,286 A | 7/1996 | Hoff | |
| 5,564,599 A * | 10/1996 | Barber et al. | 222/105 |
| 5,613,446 A | 3/1997 | DiLuigi et al. | |
| RE35,580 E | 8/1997 | Heider et al. | |
| 5,690,466 A | 11/1997 | Gaddis et al. | |
| 5,782,524 A | 7/1998 | Heider et al. | |
| 5,836,480 A * | 11/1998 | Epp et al. | 222/143 |
| 5,911,337 A | 6/1999 | Bedeker | |
| 5,927,558 A * | 7/1999 | Bruce | 222/185.1 |
| 5,971,219 A * | 10/1999 | Karpisek | 222/185.1 |
| 6,120,233 A | 9/2000 | Adam | |
| 6,155,175 A | 12/2000 | Rude et al. | |
| 6,190,107 B1 | 2/2001 | Lanigan et al. | |
| 6,205,938 B1 * | 3/2001 | Foley et al. | 111/170 |
| 6,247,594 B1 * | 6/2001 | Garton | 206/512 |
| 6,328,183 B1 * | 12/2001 | Coleman | 222/185.1 |
| 6,401,983 B1 | 6/2002 | McDonald et al. | |
| 6,415,909 B1 | 7/2002 | Mitchell et al. | |
| 6,457,291 B2 | 10/2002 | Wick | |
| 6,772,912 B1 | 8/2004 | Schall et al. | |
| 6,783,032 B2 * | 8/2004 | Fons | 222/148 |
| 6,902,061 B1 * | 6/2005 | Elstone | 206/600 |
| 6,968,946 B2 * | 11/2005 | Shuert | 206/386 |
| 7,240,681 B2 | 7/2007 | Saik | |
| 7,252,309 B2 | 8/2007 | Eng Goh | |
| 7,284,579 B2 * | 10/2007 | Elgan et al. | 141/316 |
| 7,316,333 B2 | 1/2008 | Wegner | |
| 7,475,796 B2 * | 1/2009 | Garton | 222/185.1 |
| 7,837,427 B2 | 11/2010 | Beckel et al. | |
| 7,921,783 B2 | 4/2011 | Forbes et al. | |
| 7,967,161 B2 | 6/2011 | Townsend | |
| 8,083,083 B1 | 12/2011 | Mohns | |
| 8,201,520 B2 * | 6/2012 | Meritt | 119/53 |
| 2001/0022308 A1 * | 9/2001 | Epp et al. | 222/185.1 |
| 2003/0111470 A1 | 6/2003 | Fouillet et al. | |
| 2004/0084874 A1 | 5/2004 | McDougall | |
| 2006/0180062 A1 | 8/2006 | Furrer et al. | |
| 2006/0180232 A1 | 8/2006 | Glewwe et al. | |
| 2006/0267377 A1 | 11/2006 | Lusk et al. | |
| 2008/0008562 A1 | 1/2008 | Beckel et al. | |
| 2008/0029546 A1 * | 2/2008 | Schuld | 222/185.1 |
| 2008/0029553 A1 * | 2/2008 | Culleton | 222/460 |
| 2008/0179054 A1 | 7/2008 | McGough et al. | |
| 2008/0179324 A1 | 7/2008 | McGough et al. | |
| 2008/0226434 A1 | 9/2008 | Smith et al. | |
| 2009/0038242 A1 | 2/2009 | Cope | |
| 2009/0078410 A1 | 3/2009 | Krenek et al. | |
| 2010/0040446 A1 | 2/2010 | Renyer | |
| 2011/0011893 A1 * | 1/2011 | Cerny | 222/185.1 |
| 2011/0101040 A1 | 5/2011 | Weissbrod | |
| 2012/0219391 A1 | 8/2012 | Teichrob et al. | |
| 2013/0022441 A1 | 1/2013 | Uhryn et al. | |

* cited by examiner

PROPPANT STORAGE VESSEL AND ASSEMBLY THEREOF

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to storage containers. More particularly, the present invention the relates to storage container assemblies whereby a product in one container can flow to an interior volume of a lower container. Additionally, the present invention relates to containers that are suitable for the transport, storage and dispensing of proppants therefrom.

2. Description of Related Art including Information Disclosed under 37 CFR 1.97 and 37 CFR 1.98.

Hydraulic fracturing is the propagation of fractions in a rock layer caused by the presence of pressurized fluid. Hydraulic fractures may form naturally, in the case of veins or dikes, or may be man-made in order to release petroleum, natural gas, coal scam gas, or other substances for extraction. Fracturing is done from a wellbore drilled into reservoir rock formations. The energy from the injection of a highly-pressurized fracking fluid creates new channels in the rock which can increase the extraction rates and ultimate recovery of fossil fuels. The fracture width is typically maintained after the injection by introducing a proppant into the injected fluid. Proppant is a material, such as grains of sand, ceramic, or other particulates, that prevents the fractures from closing when the injection is stopped.

With the rise of hydraulic fracturing over the past decade, there is a steep climb in proppant demand. Global supplies are currently tight. The number of proppant suppliers worldwide has increased since 2000 from a handful to well over fifty sand, ceramic proppant and resin-coat producers.

By the far the dominant proppant is silica sand, made up of ancient weathered quartz, the most common mineral in the Earth's continental crust. Unlike common sand, which often feels gritty when rubbed between the fingers, sand used as a proppant tends to roll to the touch as a result of its round, spherical shape and tightly-graded particle distribution. Sand quality is a function of both deposit and processing. Grain size is critical, as any given proppant must reliably fall within certain mesh ranges, subject to downhole conditions and completion design. Generally, coarser proppant allows the higher flow capacity due to the larger pore spaces between grains. However, it may break down or crush more readily under stress due to the relatively fewer grain-to-grain contact points to bear the stress often incurred in deep oil- and gas-bearing formations.

Typically, in any hydraulic fracturing operation, a large amount of such proppant is required. Typically, it has been difficult to effectively store the proppant at the fracturing sites. Additionally, it has been found to be rather difficult to effectively transport the proppant to the desired location. Often, proppant is hauled to the desired locations on the back of trucks and is dumped onsite. Under such circumstances, the proppant is often exposed to adverse weather conditions. This will effectively degrade the quality of the proppant during its storage. Additionally, the maintenance of proppant in containers at the hydraulic fracturing site requires a large capital investment in storage facilities. Typically, the unloading of such storage facilities is carried out on a facility-by-facility basis. As such, there is a need to be able to effectively transport the proppant to and store the proppant in a desired location adjacent to the hydraulic fracturing location.

In the past, various patents have issued relating to storage and transport facilities. For example, U.S. Patent Publication No. 2008/0179054, published on Jul. 31, 2008 to McGough et al., shows a bulk material storage and transportation system. In particular, the storage system is mounted on the trailer of a truck. The storage system includes walls that define an interior volume suitable for receiving the aggregate material therein. There are hoppers provided at the bottom of the container. These hoppers have inclined walls. The hoppers can extend so as to allow the material from the inside of the container to be properly conveyed to a location exterior of the container. Actuators are used so as to expand and collapse the container.

U.S. Pat. No. 7,240,681, issued on Jul. 10, 2007 to L. Saik, describes a trailer-mounted mobile apparatus for dewatering and recovering formation sand. The trailer is mounted to a truck-towable trailer so as to receive sand therein. The container has a pair of sloping end walls. The back end of the container is suitably openable so as to allow the sand to be removed therefrom. A pneumatic or hydraulic ram is provided on the forward part of the container so as to allow the container to be lifted angularly upwardly so as to allow sand to be discharged through the gate at the rear of the container.

U.S. Pat. No. 4,247,228, issued on Jan. 27, 1981 to Gray et al., describes a dump truck or trailer with a pneumatic conveyor. The container is mounted to a frame on wheels. A hydraulic ram tilts the container for dumping through a rear outlet. A pneumatic conveyor is carried by the frame with an intake at the rear of the container. A gate allows the solids to be dumped conventionally by gravity or to be blown to a storage facility by the pneumatic container. The container has a top hatch formed therein so as to allow the solids to be introduced into the interior of the container.

U.S. Pat. No. 2,865,521, issued on Dec. 23, 1958 to Fisher et al., shows a bulk material truck that has an interior volume suitable for the receipt of bulk material therein. A pneumatic conveyer is utilized so as to allow the removal of such material from the bottom of the container. A pair of sloping walls are provided on opposite sides of the container so as to allow the bulk material within the container to be passed toward the bottom of the container. A top hatch is provided on the top of the conveyer. The pneumatic conveyer is connected to the bottom of the container.

It is an object of the present invention to provide a proppant storage vessel that allows proppant to be easily transported and stored.

It is another object of the present invention to provide a proppant storage vessel that allows the proppant that is contained within the storage vessel to be easily and efficiently discharged through the bottom thereof.

It is another object of the present invention to provide a proppant storage assembly which allows for the effective storage of proppant a the fracturing site.

It is another object of the present invention to provide a proppant storage assembly which allows proppant to be efficiently removed from a stacked configuration of containers.

These and other objects and advantages of the present invention will become apparent from a reading of the attached specification and appended claims.

BRIEF SUMMARY OF THE INVENTION

The present invention is a proppant storage vessel that comprises a container having a first end wall, a second end wall, a first side wall and a second side wall. The container also has a top wall and a bottom wall which serve to define an interior volume therein. A hatch is formed on the bottom wall of the container. The bottom hatch is movable between an open position and a closed position. A first inclined surface is positioned in the interior volume. The first inclined surface extends from the first end wall to the bottom hatch. A second inclined surface extends from the second end wall toward the bottom hatch. A third inclined surface extends from the first side wall toward the bottom hatch. A fourth inclined surface extends from the second side wall toward the bottom hatch.

A top hatch formed on the top wall. The top hatch is movable between an open position and a closed position.

Each of the first and second end walls and the first and second side walls have a middle. The first inclined surface has an upper end affixed to the first end wall below the middle thereof. The second inclined surface has an upper end affixed to the second end wall below the middle thereof. The third inclined surface has an upper end affixed to the first side wall below the middle thereof. The fourth inclined surface has an upper end thereof affixed to the second side wall below the middle thereof.

A first support brace is affixed to the first and second end walls and extends therebetween. A second support brace is affixed to the first and second side walls and extends therebetween. A first support member has one end affixed to the bottom wall and extends angularly upwardly. The first support member has an opposite end affixed centrally to the first inclined surface. A second support member has one end affixed to the bottom wall and extends angularly upwardly therefrom. The second support member has an opposite end affixed centrally to the second inclined surface. Each of the first, second, third and fourth inclined surfaces has a bottom edge positioned adjacent a perimeter of the bottom hatch. The bottom hatch is hingedly affixed to the bottom wall. The bottom hatch resides against the bottom wall when in the closed position.

The present invention is also a proppant storage assembly that comprises a first container having an interior volume and a second container supported in spaced relation above the first container. The first container has a bottom wall having a bottom hatch affixed thereto. The hatch is movable between an open position and a closed position. The first container has an opening at a top wall thereof. The second container has bottom hatch formed on a bottom wall thereof. The bottom hatch of the second container is aligned with the opening of the first container such that a proppant in the first container can flow through the hatch thereof into the interior volume of the first container.

In particular, the first container has a top hatch hingedly affixed at the opening thereof. The top hatch of the first container is movable between a closed position and an open position. The bottom hatch of the second container has a length dimension. The length dimension is slightly less than a distance between the first container and the second container. The top hatch of the first container extends in parallel relation to the bottom hatch of the second container when each of the top hatch of the first container and the bottom hatch of the second container are in the open position.

A first spacer is positioned on the top wall of the first container and extends upwardly therefrom. The first spacer abuts the bottom wall of the second container. A second spacer is positioned on the top wall of the first container and extends upwardly therefrom. The second spacer abuts the bottom wall of the second container. The first spacer is in spaced relation to the second spacer. A pad is positioned against the bottom wall of the first container. The pad supports the bottom wall of the first container a desired distance above an underlying surface. The bottom hatch of the first container has a length dimension. This length dimension is less than a desired distance between the bottom wall and the underlying surface. As such, a portable conveyer can be placed thereunder. The portable conveyor has a surface positioned between the bottom wall of the first container and the underlying surface. The surface of the portable container is directly below the bottom hatch of the first container.

Each of the first and second containers has a first end wall, a second end wall, a first side wall and a second side wall. A first inclined surface is positioned in the interior volume of the container so as to extend from the first end wall toward the bottom hatch. A second inclined surface is positioned in the interior volume of the container so as to extend from the second end wall toward the bottom hatch. A third inclined surface is positioned in the interior volume so as to extend from the first side wall toward the bottom hatch. A fourth inclined surface is positioned in the interior volume so as to extend from the second side wall toward the bottom hatch.

A third container can be supported in spaced relation above the second container. The second container has a top hatch formed on a top wall thereof. The third container has a bottom hatch formed on a bottom wall thereof. The bottom hatch of the third container is aligned with the top hatch of the second container. Each of the containers is ocean freight container.

In an alternative embodiment of the present invention, the first container has the first side wall, a second side wall, a first end wall and second end wall hingedly mounted to the bottom wall thereof A first slot and a second slot are affixed to the bottom wall of the container. The first and second slots are suitable for the receipt of forks of a forklift therein.

The foregoing Summary of the Invention is intended to describe, in summary, the preferred embodiments of the present invention. However, this section is not intended, in any way, to limit the scope of the present invention. The scope of the present invention should be defined by the claims herein and their legal equivalents.

DETAILED DESCRIPTION OF THE INVENTION

Figure 1:
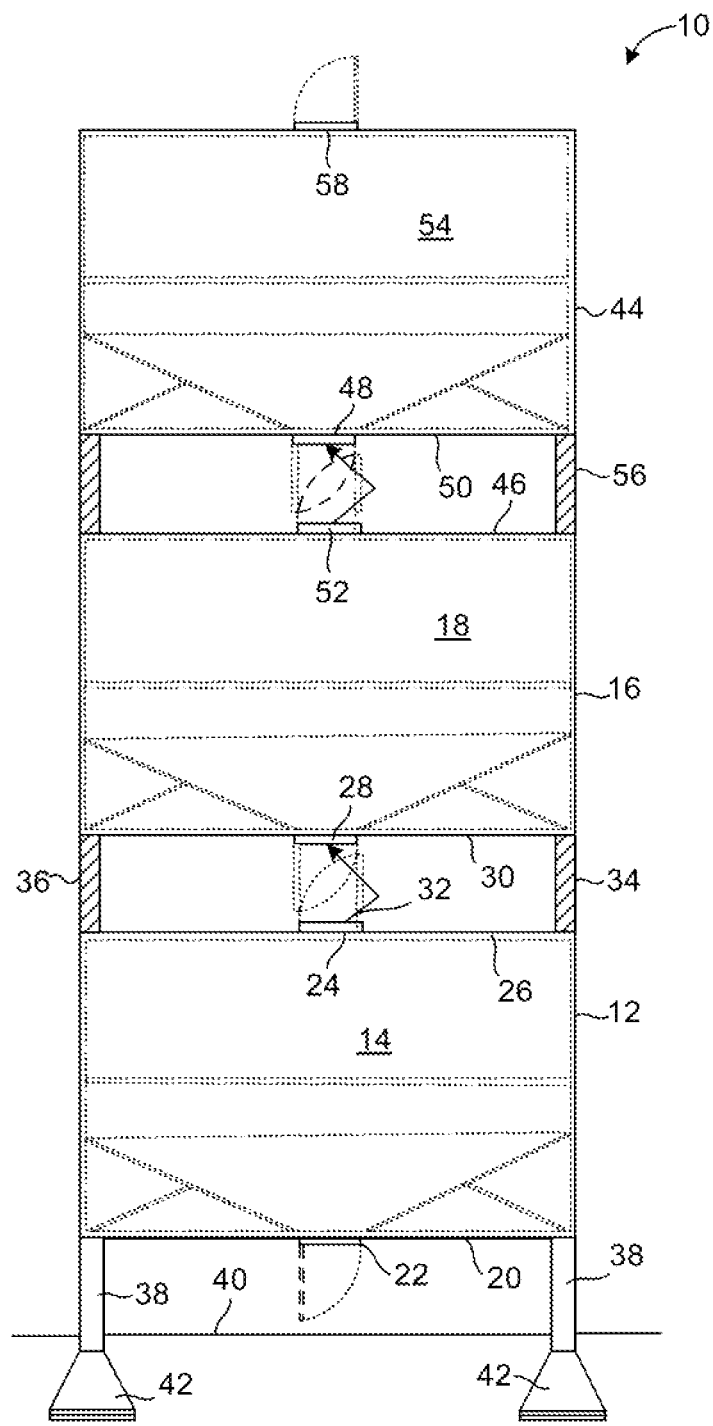
FIG. 1 is a side elevational view of the proppant storage assembly in accordance with the preferred embodiment of the present invention.

Referring to FIG. 1, there is shown the proppant storage assembly 10 in accordance with the preferred embodiment of the present invention. The proppant storage assembly 10 includes a first container 12 having an interior volume 14 and a second container 16 having a interior volume 18. The first container 12 is in spaced relationship to the second container 16. The first container 12 has a bottom wall 20. The bottom wall 20 has a bottom hatch 22 affixed thereto. The hatch 22 is movable between a closed position and an open position (illustrated in broken line fashion). The first container 12 has an opening 24 at a top wall 26 thereof. The second container 16 has a hatch 28 formed on a bottom wall 30 thereof. The bottom hatch 28 of the second container 16 is shown as aligned with the opening 26 of the first container 12 such that a proppant within the second container 16 can flow through the hatch 28 into the interior volume 14 of the first container 12.

In particular, in FIG. 1, it can be seen that the first container 12 has a hatch 32 extending over the opening 24 thereof. In particular, the hatch 32 is hingedly mounted to the top wall 26 of the first container 12 so as to be movable between a closed position and an open position (illustrated in broken-line fashion). In particular, the bottom hatch 28 of the second container 16 will extend downwardly perpendicularly to the bottom wall 30. Similarly, the top hatch 32 of the first container 12 will extend upwardly in generally transverse relationship to the top wall 26. The hatches 28 and 38 will be in generally parallel relationship in this configuration. As such, the hatches 24 and 28 will form a unique and guided flowpath whereby the proppant in the interior volume 18 of the second container 16 can flow directly into the opening 24 and into the interior volume 14 of the first container 12. The length dimension of the hatches 28 and 32 will be less than the distance between the top wall 26 of the first container 12 and the bottom wall 30 of the second container 16.

A first spacer 34 is positioned on the top wall 26 of the first container 12 and extends upwardly therefrom. The first spacer 34 abuts the bottom wall 30 of the second container 16. A second spacer 36 is positioned on the top wall 26 of the first container 12 and extends upwardly therefrom. The second spacer 36 abuts the bottom wall 30 of the second container 16. The first spacer 34 is in spaced relationship to the second spacer 36. The spacers 34 and 36 serve to assure a proper distance between the containers 12 and 16 whereby the hatches 28 and 32 can be properly opened so as to allow for the flow of proppant therebetween. A pad 38 is positioned against the bottom wall 20 of the first container 12. The pad 38 serves to support the first container 12 above an underlying surface 40 (such as the earth). It can be seen that the pad 38 is in the nature of a concrete structure that has a base 42 embedded into the earth. As such, the pad 38 is configured so as to rigidly support the containers 12 and 16 in their desired positions above the earth.

Pad 38 support the container 12 in a suitable distance above the underlying surface 40 such that the hatch 22 can move from its closed position to its open position while allowing a certain amount of space therebetween. As a result, a portable conveyer can be placed below the bottom hatch 22 so as to allow the proppant within the interior volume 14 to be discharged therefrom.

A third container 44 is supported in spaced relationship above the top wall 46 of the second container 16. As can be seen, the third container has a bottom hatch 48 located on the bottom wall 50 thereof. The top wall 46 has a top hatch 52 hingedly connected thereto. As a result, when the bottom hatch 48 is opened and the top hatch 52 is opened (as illustrated in broken-line fashion), the proppant within the interior volume 54 of the third container 44 can flow directly into the interior volume 18 of the second container 16. Suitable spacers 56 serve to support the bottom wall 50 of the third container 44 a proper distance above the top wall 46 of the second container 16. Third container 44 also has a top hatch 58 that is movable between a closed position and an open position (illustrated in broken-line fashion).

In the configuration shown in FIG. 1, volumes of proppants can be easily stored at the fracturing site. It is only necessary to stack each of the containers 12, 16 and 44 upon one another in the manner described in FIG. 1. Each of the containers 12, 16 and 44 has an exterior configuration similar to that of an ocean freight container. As such, these containers can be easily transported on the bed of a truck, on a freight train or on a ship to the desired location. Because of this stacking arrangement, special proppant storage facilities are not required at the fracturing site. Each of the hatches 28, 32, 48, 52 and 58 can be in a liquid-tight sealing relationship over the respective openings thereof when in the closed position. As such, the arrangement illustrated in FIG. 1 of the proppant storage assembly 10 can avoid any liquid intrusion into the proppant contained within each of the containers 12, 16 and 44. Typically, a forklift, or other lifting device, can be utilized so as to properly stack the containers. Within the concept of the present invention, two containers, three containers, or more can be utilized in the construction of the proppant storage assembly 10. Each of the containers 12, 16 and 44 has an interior structure in the nature illustrated in FIGS. 3-6 herein, as will be described hereinafter. The present invention provides a suitably modular arrangement whereby a proppant storage facility can be easily constructed on-site. After the fracturing operation is completed, the containers can be easily removed from this stacked configuration and transported to another location. Similarly, if desired, the containers 12, 16 and 44 can be suitably replaced by another container so as to provide the desired proppant to the fracturing site.

Figure 2:
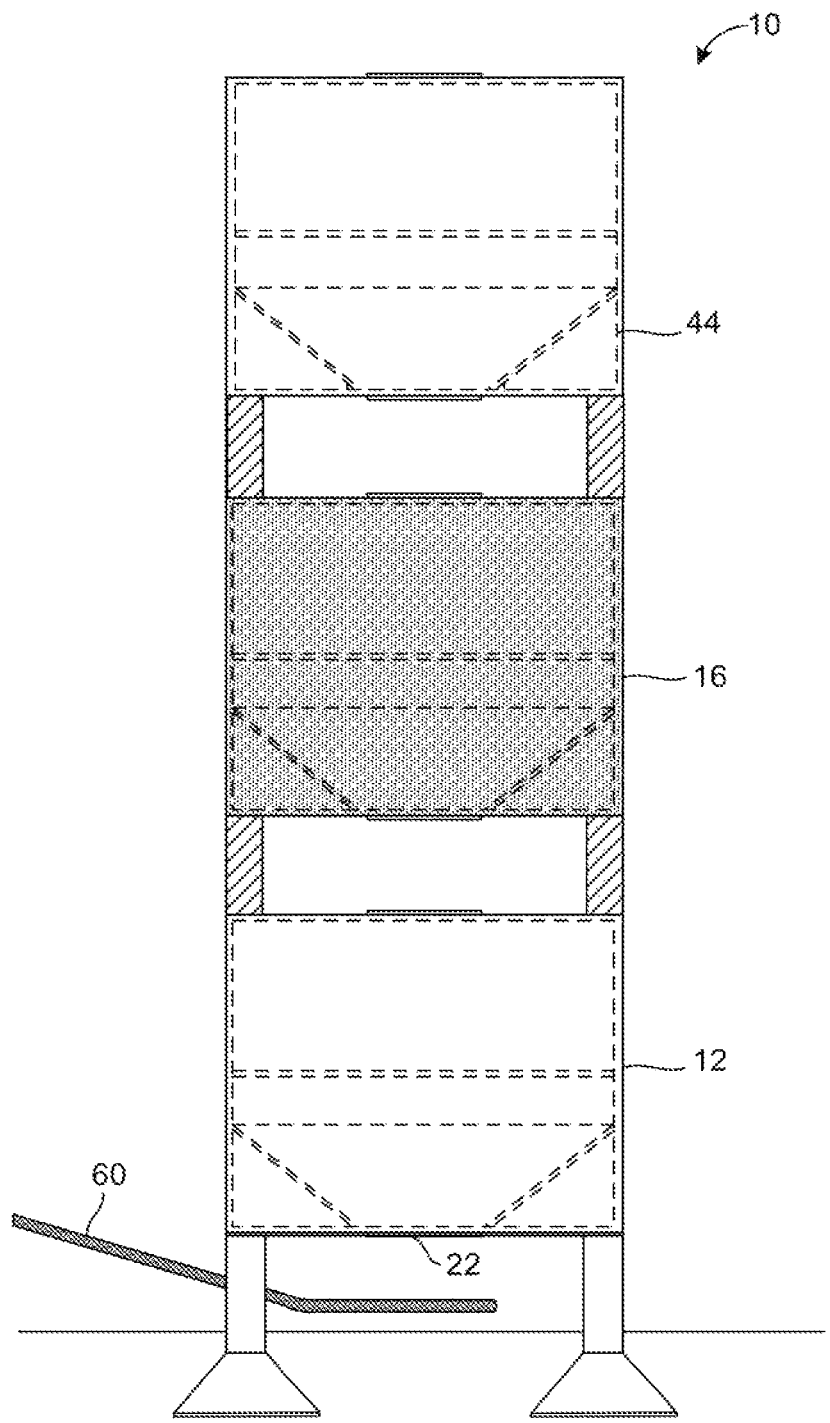
FIG. 2 is an end view of the proppant storage assembly of the present invention showing, in particular, the portable conveyer located at a bottom thereof

FIG. 2 shows an end view of the proppant storage assembly 10 of the present invention showing of the present invention. In FIG. 2, it can be seen that the first container 12 is spaced from the second container 16. The second container 16 is suitably spaced from the third container 44. The bottom hatch 22 of the first container is openable so that the proppant within the first container 12 can be discharged through the hatch 22 onto a portable conveyer 60. The portable conveyer 60 can be easily transported to a location below the hatch 22 of the first container 12 so as to allow the proppant from the containers to be transported to another location. Each of the containers 12, 16 and 44 is vertically aligned in a stacked orientation. The first container has a capacity for storing 100,000 pounds of proppant. The second container 16 and the third container 44 can store 30,000 pounds of proppant. As such, a very large amount of proppant can be provided to the fracturing site, in a simple easy and convenient manner.

Figure 3:
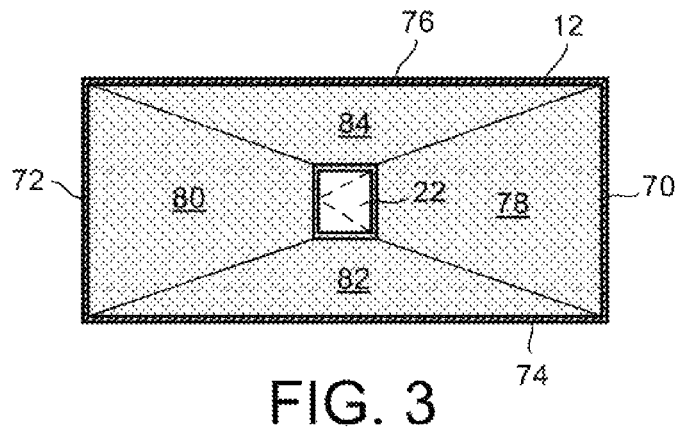
FIG. 3 is a transparent plan view of the proppant storage container in accordance with the preferred embodiment of the present invention.

FIG. 3 illustrates the interior construction of the first container 12. The top wall of the first container 12 has been removed for the purposes of illustration. The container 12 has a first end wall 70, a second end wall 72, a first side wall 74 and a second side wall 76. The end walls 70 and 72 extend between the side walls 74 and 76 so as to define the interior volume of the first container 12. A first inclined surface 78 extends from the first end wall 70 to the bottom hatch 22. A second inclined surface 80 extends from the second end wall 72 toward the bottom hatch 22. A third inclined surface 82 extends from the first side wall 74 toward the bottom hatch 22. Similarly, a fourth inclined surface 84 extends from the second side wall 76 toward the bottom hatch 22. Lower ends of each of the inclined surface 78, 80, 82 and 84 are aligned with the perimeter of the bottom hatch 22. The inclining of the side walls 78, 80, 82 and 84 serves to assure that the proppant contained within the interior volume thereof is suitably funneled toward the bottom hatch 22. Each of the inclined surface 78, 80, 82 and 84 is has a smooth surface so that a constant flow of proppant can occur.

Figure 4:
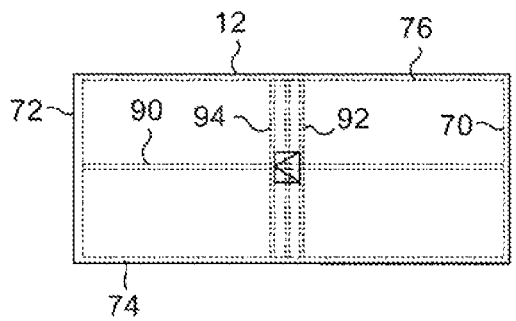
FIG. 4 is a plan view showing of the proppant storage container of the present invention.

FIG. 4 illustrates the bracing associated with the first container 12 so as to assure the structural integrity of the container. As can be seen, a first support brace 90 is affixed to the first end wall 70 and extends across the interior volume of the container 12 to the second end wall 72. The first support brace 90 is suitably welded to the end walls 70 and 72 so as to provide a rigid structural support therebetween. A second support brace 92 has one end affixed to the side wall 74 and an opposite end affixed to the side wall 76. The second support brace 92 extends transversely to the first support brace 90. The second support brace 92 provides a rigid support for the side walls 74 and 76. The first support brace 90 and the second support brace 92 structurally enhance the strength of the container 12 so as to as to withstand the weight of the proppant that is contained therein. The second support brace 92 can also include another support brace 94 extending between the side walls 74 and 76 in generally parallel relationship to the first support brace 90. Within the concept of the present invention, various other support braces, in the nature of angle irons, can be utilized so as to suitably support the structure of the container 12.

Figure 5:
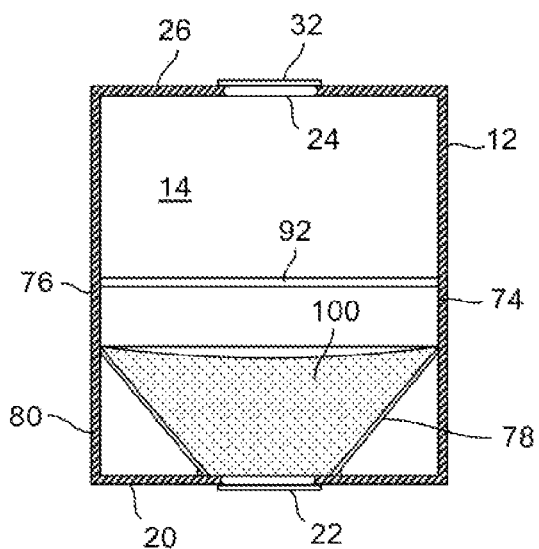
FIG. 5 is a cross-sectional view as taken from an end of the proppant storage container of the present invention.

FIG. 5 illustrates a cross-sectional view of the container 12. As can be seen, the container 12 has the bottom hatch 22 located on the bottom wall 20 thereof. A top hatch 32 is hingedly mounted to the top wall 26 thereof. Hatch 32 serves to cover the opening 24 in the top wall 26. The bottom hatch 22 is hingedly mounted to the bottom surface of the bottom wall 20 and can be suitably latched to the bottom wall 20 so as to retain the proppant 100 therein. The container 12 has its side walls 74 and 76 extending vertically upwardly from the bottom wall 20. The first inclined surface 78 and the second inclined surface 80 are illustrated as funneling the proppant 100 toward the bottom hatch 22. The first inclined surface 78 has one end mounted adjacent to hatch 22 and an opposite end affixed to the side wall 74. In particular, the inclined surface 78 has its opposite end at the side wall 74 located below the middle of the side wall 74. Similarly, the second inclined surface 80 extends from the hatch 22 toward the side wall 76 at a location below the middle of the side wall 76. The second support brace 92 is illustrated as extending across the interior volume 14 of the first container 12 between the side walls 74 and 76.

Figure 6:
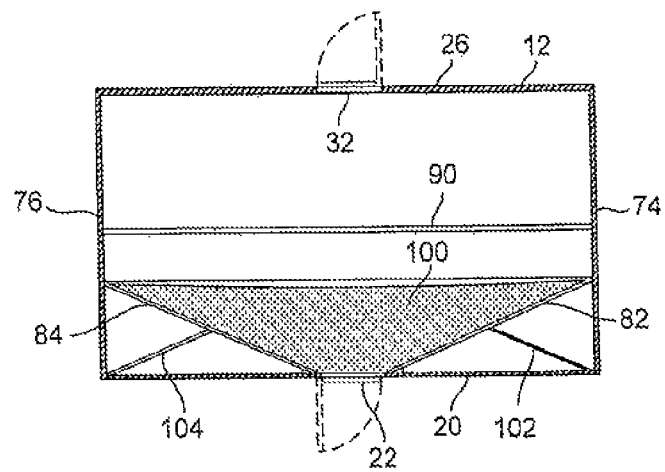
FIG. 6 is cross-sectional view as taken across a side of the proppant storage container of the present invention.

FIG. 6 shows another cross-sectional view of the first container 12. First container 12 is illustrated also as having the top hatch 32 hingedly mounted to the top wall 26 and the bottom hatch 22 hingedly mounted to the bottom wall 20. The third inclined surface 82 extends from the bottom hatch 22 to the side wall 74. The fourth inclined surface 84 extends from the bottom hatch 22 toward the side wall 76. Each of the ends of the inclined surfaces 82 and 84 will joined to the respective walls 74 and 76 at a location below the middle of each of the side walls 74 and 76. The first support brace 90 extends between the side walls 74 and 76 so as to provide structural integrity.

In FIG. 6, there is a first support member 102 that extends from the bottom wall 20 upwardly toward a location centrally of the third inclined surface 82. Another support member 104 extends from the bottom wall 20 upwardly toward a center of the fourth inclined surface 84. These support members 102 and 104 enhance the strength of the inclined surface 82 and 84 so as to withstand the weight and forces imparted thereto by the proppant 100.

Figure 7:
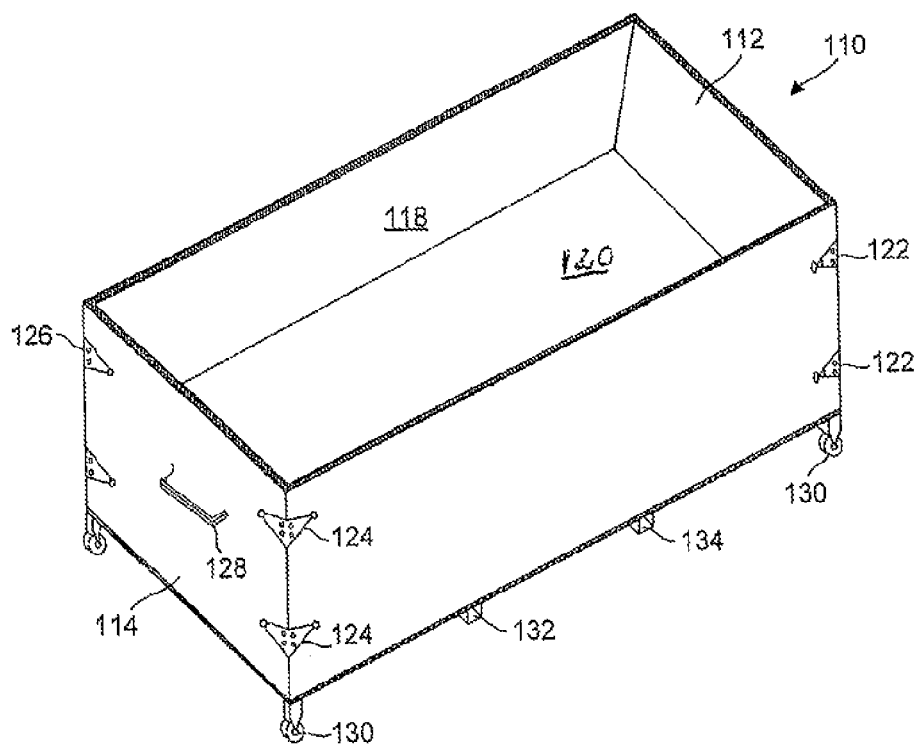
FIG. 7 is a perspective view of an alternative embodiment of the proppant storage container of the present invention.

FIG. 7 shows an alternative embodiment of the container 110 of the present invention. Container 110 includes a first end wall 112, a second end wall 114, a first side wall 116, and a second side wall 118. Each of the end walls 112 and 114 and each of the side walls 116 and 118 are illustrated as extending upwardly from a bottom wall 120.

Within concept shown in FIG. 7, each of the end walls 112 and 114 and each of the side walls 116 and 118 are hingedly mounted to the bottom wall 120. It can be seen that there are latch members 122, 124 and 126 that serve to secure the walls 112, 114, 116 and 118 in their upright configuration. Latch members 122 join the side wall 116 to the end 112. Latch members 124 join the side wall 116 to the end walls 114. Latch members 126 secure the end wall 114 to the side walls 118. An additional latch member (not illustrated) will secure the end wall 112 to the side wall 118. As such, the structure of the container 110 can be in a sand-receiving orientation.

Importantly, since each of the walls 112, 114, 116 and 118 are hingedly secured to the bottom wall 120, the walls can be pivoted about the hinges so as to overlie the bottom 112 once the latch members 122, 124 and 126 are released. A handle 128 is provided on the end walls 112 and 114 so as to allow the container 110 to be moved, as desired. Wheels 130 extend downwardly from the bottom wall 120 so as to allow the container 110 to be rolled to a desired position.

In FIG. 7, there is first slot 132 and a second slot 134 formed on the bottom of the bottom surface 120. Slots 132 and 134 allow for the receipt of the forks of a forklift therein. As such, the container 110 can be moved to a desired location in a simple and efficient manner.

The foregoing disclosure and description of the invention is illustrative and explanatory thereof Various changes in the details of the illustrated construction can be made within the scope of appended claims without departing from the true spirit of the invention. The present invention should only be limited by the following claims and their legal equivalents.

I claim:

1. A proppant storage vessel comprising:
   a container having a first end wall and a second end wall and a first side wall and a second side wall and a top wall and a bottom wall, said first and second end walls extending between opposite ends of said first and second side walls, said first and second end walls and said first and second side walls and said top and bottom walls defining an interior volume of said container, said first end wall and said second end wall and said first side wall and said second side wall and said top wall and said bottom wall being fixedly and rigidly connected together;
   a bottom hatch formed generally centrally on said bottom wall of said container, said bottom hatch swingably movable between an open position and a closed position, said hatch extending transverse to said bottom wall when in said open position;

a first inclined surface positioned in said interior volume, said first inclined surface extending from said first end wall toward said bottom hatch;

a second inclined surface positioned in said interior volume, said second inclined surface extending from said second end wall toward said bottom hatch;

a third inclined surface positioned in said interior volume, said third inclined surface extending from said first side wall toward said bottom hatch;

a fourth inclined surface positioned in said interior volume, said fourth inclined surface extending from said second side wall toward said bottom hatch;

a first support member having one end affixed to said bottom wall and extending angularly upwardly therefrom, said first support member having an opposite end affixed centrally to said first inclined surface; and a second support member having one end affixed to said bottom wall and extending angularly upwardly therefrom, said second support member having an opposite end affixed centrally to said second inclined surface.

2. The proppant storage vessel of claim 1, further comprising:

a top hatch formed on said top wall, said top hatch swingably movable between an open position and a closed position, said top hatch extending transverse to said top wall in said open position.

3. The proppant storage vessel of claim 1, each of said first and second end walls and said first and second side walls have a middle, said first inclined surface having an upper end affixed to said first end wall below the middle thereof, said second inclined surface having an upper end affixed to said second end wall below the middle thereof, said third inclined surface having an upper end affixed to said first side wall below the middle thereof, said fourth inclined surface having an upper end thereof affixed to said second side wall below the middle thereof.

4. The proppant storage vessel of claim 1, further comprising:

a first support brace affixed to said first and second end walls and extending therebetween; and a second support brace affixed to said first and second side walls and extending therebetween.

5. The proppant storage vessel of claim 1, each of said first and second and third and fourth inclined surfaces having a bottom edge positioned adjacent a perimeter of said bottom hatch.

6. The proppant storage vessel of claim 1, said bottom hatch being hingedly affixed to said bottom wall, said bottom hatch residing against said bottom wall when in said closed position.

7. A proppant storage assembly comprising:

a first container having an interior volume, said first container having a bottom wall, said bottom wall having a bottom hatch affixed thereto, said bottom hatch being movable between an open position and a closed position, said first container having an opening at a top wall thereof; and a second container supported in spaced relation above said first container, said second container having bottom hatch formed on a bottom wall thereof, said bottom hatch being swingably movable between an open position and a closed position, said bottom hatch extending transverse thereof said bottom wall in said open position, said bottom hatch of said second container being aligned with said opening of said first container such that a proppant in said second container can flow through said bottom hatch thereof into said interior volume of said first container when said bottom hatch of said second container is in said open position, said first container having a top hatch hingedly affixed at said opening thereof, said top hatch of said first container movable between a closed position and an open position, said bottom hatch of said second container having a length dimension, said length dimension being slightly less than a distance between said top wall of said first container and said bottom wall of said second container, said top hatch of said first container extending in parallel relation to said bottom hatch of said second container when each of said top hatch of said first container and said bottom hatch of said second container are in the open position, each of said first and second containers comprising a first end wall and a second end wall and a first side wall and a second side wall, said first and second end walls extending between opposite ends of said first and second side walls, said first and second end walls and first and second side walls and said top and bottom walls defining the interior volume of said container, each of said first and second containers having a first inclined surface positioned in the interior volume so as to extend from the first end wall toward the bottom hatch and a second inclined surface positioned in the interior volume and extending from the second end wall toward the bottom hatch and a third inclined surface positioned in the interior volume and extending from the first side wall toward the bottom hatch and a fourth inclined surface positioned in the interior volume and extending from the second side wall toward the bottom hatch, said first end wall and said second end wall and said first side wall and said second side wall and said top wall and said bottom wall being fixedly and rigidly connected together.

8. The proppant storage assembly of claim 7, further comprising:

a first spacer positioned on said top wall of said first container and extending upwardly therefrom, said first spacer abutting said bottom wall of said second container; and a second spacer positioned on said top wall of said first container and extending upwardly therefrom, said second spacer abutting said bottom wall of said second container, said first spacer being in spaced relation to said second spacer.

9. The proppant storage assembly of claim 7, further comprising:

a pad positioned against said bottom wall of said first container, said pad supporting said bottom wall of said first container in spaced relationship above an underlying surface.

10. The proppant storage assembly of claim 9, said bottom hatch of said first container having a length dimension, said length dimension being less than a distance between said bottom wall and the underlying surface.

11. The proppant storage assembly of claim 9, further comprising:

a portable conveyor having a surface positioned between said bottom wall of said first container and the underlying surface, said surface of said portable conveyor being directly below said bottom hatch of said first container.

12. The proppant storage assembly of claim 7, further comprising:

a third container supported in spaced relation above said second container, said second container having a top hatch formed on a top wall thereof, said third container having a bottom hatch formed on a bottom wall thereof, said bottom hatch of said third container being aligned with said top hatch of said second container.

13. The proppant storage assembly of claim 7, each of said first and second containers being of an ocean freight container shape.

14. The proppant storage assembly of claim 7, said first container having a first side wall and a second side wall and a first end wall and second end wall each hingedly mounted to said bottom wall thereof.

15. The proppant storage assembly of claim 13, said first container having a first slot and a second slot affixed to said bottom wall thereof, said first and second slots suitable for receipt of forks of a forklift therein.

\* \* \* \* \*